United States Patent
Hummel et al.

(10) Patent No.: US 8,875,256 B2
(45) Date of Patent: Oct. 28, 2014

(54) DATA FLOW PROCESSING IN A NETWORK ENVIRONMENT

(71) Applicant: Advanced Micro Devices, Inc., Sunnyvale, CA (US)

(72) Inventors: Mark Hummel, Franklin, MA (US); David E. Mayhew, Northborough, MA (US); Michael J. Osborn, Hollis, NH (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 13/675,401

(22) Filed: Nov. 13, 2012

(65) Prior Publication Data

US 2014/0137215 A1 May 15, 2014

(51) Int. Cl.
- H04L 29/06 (2006.01)
- G06F 21/00 (2013.01)
- H04L 12/46 (2006.01)
- G06F 13/40 (2006.01)
- H04L 12/70 (2013.01)
- H04L 12/863 (2013.01)

(52) U.S. Cl.
CPC ........ H04L 63/08 (2013.01); *G06F 2213/0026* (2013.01); H04L 12/4641 (2013.01); H04L 63/123 (2013.01); H04L 63/06 (2013.01); *G06F 13/4022* (2013.01)
USPC ............... 726/5; 709/207; 709/236; 370/235; 370/389

(58) Field of Classification Search
CPC ............ H04L 12/5692; H04L 12/5689; H04L 9/3244; H04L 9/3202; H04L 63/04; H04L 63/0876
USPC ................ 726/5; 370/389, 235; 709/207, 236
See application file for complete search history.

(56) References Cited

U.S. PATENT DOCUMENTS 6,510,161 B2    1/2003    Trevitt et al.
6,785,892 B1    8/2004    Miller et al.
(Continued)

FOREIGN PATENT DOCUMENTS

EP          0581486      2/1994
WO    WO 2012149505 A1 * 11/2012

OTHER PUBLICATIONS

Kannan, H. ; Dalton, M. ; Kozyrakis, C.; "Decoupling Dynamic Information Flow Tracking with a dedicated coprocessor"; Dependable Systems & Networks, 2009. DSN '09. IEEE/IFIP International Conference on Digital Object Identifier: 10.1109/DSN.2009.5270347; Publication Year: Feb. 2009; pp. 105-114.*

(Continued)

*Primary Examiner* — Andrew Nalven
*Assistant Examiner* — Courtney Fields
(74) *Attorney, Agent, or Firm* — Park, Vaughan, Fleming & Dowler, LLP

(57) ABSTRACT

Described are a system and method for managing a data exchange in a network environment. A flowtag is assigned to a data packet at a source device. The flowtag includes a port identification corresponding to a port at an aggregation device. A destination device is in communication with the port at the aggregation device. The data packet is authenticated at the aggregation device. The data packet is output from the source device to the destination device via the aggregation device according to the port identification in the flowtag of the authenticated data packet.

31 Claims, 7 Drawing Sheets

(56) References Cited

U.S. PATENT DOCUMENTS

| | | | |
|---|---|---|---|
| 6,795,886 | B1 | 9/2004 | Nguyen |
| 6,823,453 | B1 | 11/2004 | Hagerman |
| 6,850,987 | B1 | 2/2005 | McCanne et al. |
| 7,421,532 | B2 | 9/2008 | Stewart et al. |
| 7,480,303 | B1 | 1/2009 | Ngai |
| 7,568,074 | B1 | 7/2009 | Kavipurapu et al. |
| 7,814,259 | B2 | 10/2010 | Stewart et al. |
| 7,913,019 | B2 | 3/2011 | Inagawa et al. |
| 7,913,027 | B2 | 3/2011 | Kloeppner et al. |
| 7,925,802 | B2 | 4/2011 | Lauterbach et al. |
| 2002/0069318 | A1 | 6/2002 | Chow et al. |
| 2002/0087751 | A1 | 7/2002 | Chong |
| 2003/0123468 | A1 | 7/2003 | Nong |
| 2004/0258062 | A1* | 12/2004 | Narvaez .................. 370/389 |
| 2005/0117578 | A1 | 6/2005 | Stewart et al. |
| 2006/0282547 | A1 | 12/2006 | Hasha et al. |
| 2007/0162572 | A1 | 7/2007 | Aloni et al. |
| 2007/0283128 | A1 | 12/2007 | Hoshaku |
| 2008/0005624 | A1 | 1/2008 | Kakivaya et al. |
| 2008/0028467 | A1 | 1/2008 | Kommareddy et al. |
| 2008/0320181 | A1 | 12/2008 | Lauterbach et al. |
| 2009/0070405 | A1 | 3/2009 | Mazzaferri |
| 2009/0216920 | A1 | 8/2009 | Lauterbach et al. |
| 2009/0323710 | A1 | 12/2009 | Shahar et al. |
| 2010/0172172 | A1 | 7/2010 | Kim et al. |
| 2010/0241722 | A1* | 9/2010 | Seminaro et al. ............ 709/207 |
| 2010/0272117 | A1 | 10/2010 | Wu et al. |
| 2011/0072204 | A1 | 3/2011 | Chang et al. |
| 2011/0103245 | A1 | 5/2011 | Lu |
| 2011/0202701 | A1 | 8/2011 | Maitra |
| 2012/0243542 | A1 | 9/2012 | Sugumar et al. |
| 2012/0284712 | A1* | 11/2012 | Nimmagadda et al. ........... 718/1 |
| 2012/0331065 | A1 | 12/2012 | Aho et al. |
| 2013/0314841 | A1 | 11/2013 | Hummel et al. |
| 2013/0339466 | A1 | 12/2013 | Mayhew et al. |
| 2013/0346645 | A1 | 12/2013 | Mayhew |

OTHER PUBLICATIONS

Whelihan, David et al.; "Memory Optimization in Single Chip Network Switch Fabrics"; Department of Electrical Engineering; Carnegie Mellon University, Pittsburgh, PA; Jun. 10-14, 2002; 6 pages.

V. Kashyap; "IP Over InfiniBand (IPoIB) Architecture", The Internet Society; 2006; 22 pages.

University of Tennessee; "Message Passing Interface Forum"; Sep. 4, 2009, 647 pages.

International Search Report and Written Opinion in Related International Patent Application No. PCT/US13/40508, mailed Jul. 29, 2013; 14 pages.

Non-Final Office Action in related U.S. Appl. No. 13/470,847, mailed on Sep. 6, 2013; 22 pages.

International Search Report & Written Opinion in related international patent application No. PCT/US13/44278, mailed on Sep. 19, 2013; 11 pages.

Loi, et al., "A Low-overhead Fault Tolerance Scheme for TSV-based 3D Network on Chip Links", IEEE International Conference on Computer-Aided Design, Nov. 10, 2008, New Jersey, USA; 5 pages.

International Search Report & Written Opinion in related international patent application No. PCT/US13/44902, mailed on Oct. 14, 2013; 11 pages.

Non-Final Office Action in related U.S. Appl. No. 13/529,452, mailed on Dec. 17, 2013; 20 pages.

Non-Final Office Action in related U.S. Appl. No. 13/675,401, mailed on Jan. 2, 2014; 20 pages.

International Search Report & Written Opinion for related international patent application No. PCT/US13/69572, mailed on Feb. 20, 2014; 14 pages.

Tanenbaum A S Ed, "Chapter 4", Computer Networks, Jan. 1, 1996, Prentice-Hall International, London, pp. 310-317.

Mayhew et al., "PCI Express and Advanced Switching: Evolutionary Path to Building Next Generation Interconnects", Proceedings from 11th Symposium on High Performance Interconnects, Aug. 20, 2003, pp. 21-29.

Non-Final Office Action in related U.S. Appl. No. 13/526,973, mailed on Mar. 17, 2014; 8 pages.

Notice of Allowance in related U.S. Appl. No. 13/470,847, mailed on Apr. 14, 2014; 19 pages.

Non-Final Office Action in related U.S. Appl. No. 13/589,463, mailed on May 9, 2014; 12 pages.

Final Office Action in related U.S. Appl. No. 13/529,452, mailed on May 12, 2014; 23 pages.

* cited by examiner

DATA FLOW PROCESSING IN A NETWORK ENVIRONMENT

FIELD OF THE INVENTION

The present invention relates generally to data networks, and more specifically, to systems and methods for controlling a data flow between data network devices.

BACKGROUND

Large network environments such as data centers can provide Internet and intranet services supporting businesses and organizations. A typical data center can house various types of electronic equipment, such as computers, domain name system (DNS) servers, network switches, routers, data storage devices, and so on. A data center can have hundreds or thousands of interconnected host devices, for example, server nodes, communicating with each other and external devices via a switching architecture comprising switches, routers, etc. In a data exchange between a host device and a network switch, the host device transmits a destination media access control (MAC) address with the data payload, for example, in an Ethernet frame, to the switch. The switch in turn decodes the MAC address to determine the intended destination of the data payload. A conventional network switch is typically configured with a content addressable memory (CAM) table that includes frame forwarding information such as destination device MAC addresses and switch port information for outputting data to the destination devices.

BRIEF SUMMARY OF EMBODIMENTS

In accordance with an aspect, there is provided a method for managing a data exchange in a network environment. A flowtag is transmitted to a source device. The flowtag includes a port identification corresponding to a port at an aggregation device. A data packet is received from the source device including the flowtag. The data packet is authenticated at the aggregation device. The authenticated data packet is output according to the port identification in the flowtag of the authenticated data packet.

In accordance with another aspect, there is provided a method for processing a data packet. A source device receives a flowtag and a credential generated at the aggregation device. The flowtag includes routing data. A data packet including the flowtag and a corresponding unit of data from the source device to an aggregation device.

In accordance with another aspect, there is provided a data network, comprising a source device, a destination device, and an aggregation device. The source device assigns a flowtag to a data packet in a data transfer operation. The destination device receives the data packet in the data transfer operation. The aggregation device has a first port to which the source device is in communication and a second port to which the destination device is in communication. The aggregation device includes a packet management device that processes routing data in the flowtag and validates a credential that seals the flowtag. The routing data in the flowtag includes a port identification corresponding to the second port. The aggregation device transfers the data packet according to the port identification in the flowtag from the source device to the destination device.

In accordance with another aspect, there is provided an aggregation device, comprising: a first port in communication with a source device, a second port in communication with a destination device, and a packet management device comprising a mapping table. The mapping table includes a first mapping between the first port and the source device and a second mapping between the second port and the destination device. The packet management device receives a unit of data from the source device and routes the data to the destination device according to information related to the second port provided with the unit of data.

In accordance with another aspect, there is provided a computer program product, comprising a computer readable storage medium having computer readable program code embodied therewith. The computer readable program code comprises computer readable program code configured to assign a flowtag to a data packet at a source device. The flowtag includes a port identification corresponding to a port at an aggregation device. A destination device is in communication with the port at the aggregation device. The computer readable program code further comprises computer readable program code configured to authenticate the data packet at the aggregation device and computer readable program code configured to output the data packet from the source device to the destination device via the aggregation device according to the port identification in the authenticated data packet.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
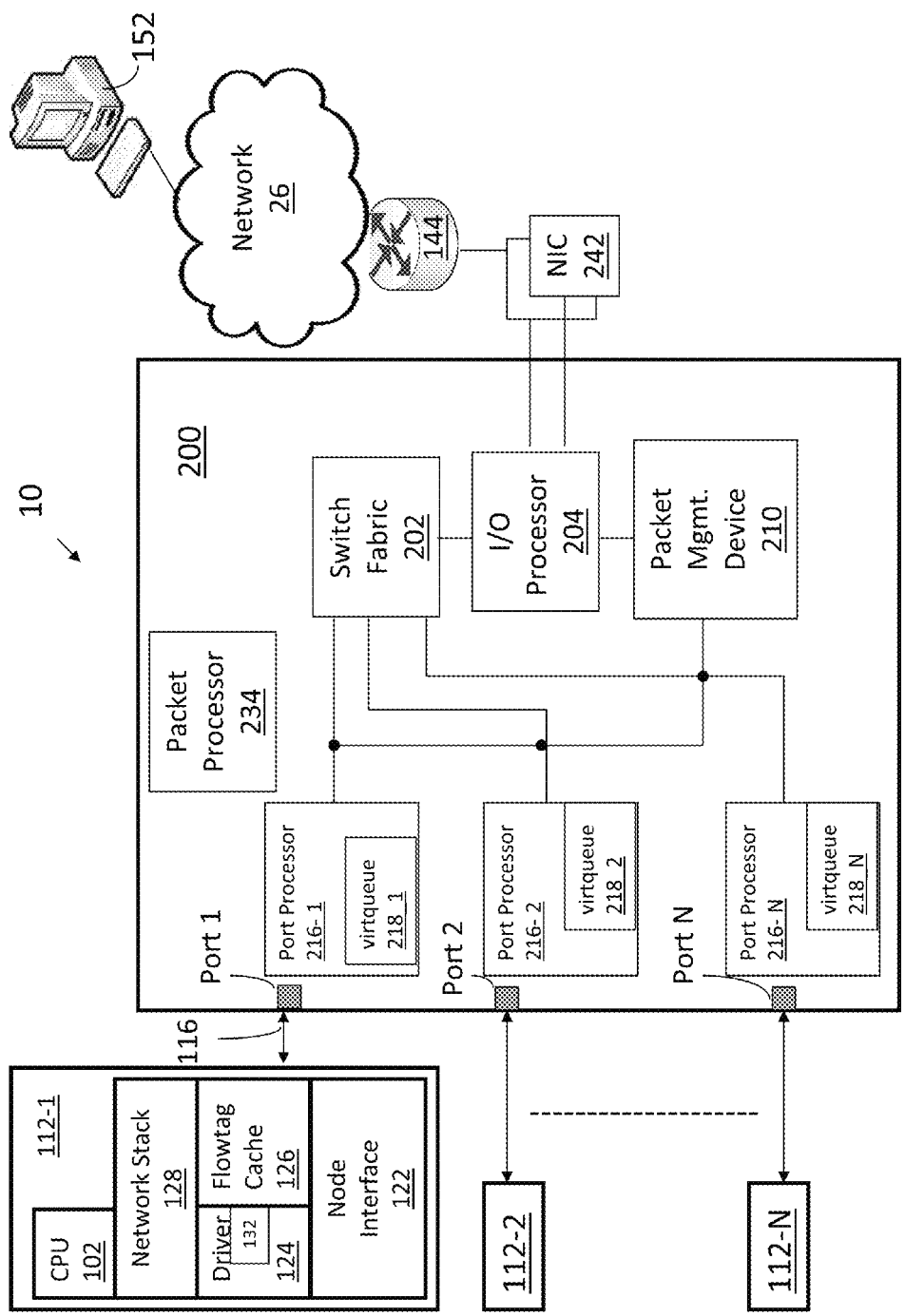
FIG. 1 is a block diagram of a computing environment, in which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

A conventional server node transmits a data packet to a network switch, which forwards the data packet to its destination device according to the source and destination MAC addresses provided with the data packet. However, the management of a switch's CAM table requires a set of logic-intensive steps, which include MAC address lookups or related decode functions, MAC address-to-port mappings, and so on. This expensive processing can be magnified in virtual network configurations, where a virtual machine (VM) is provided for each connection to the network switch, and where each VM requires one or more MAC addresses. Some features of the present inventive concepts may include an approach for efficiently controlling the routing of data packets, frames, cells, or other fixed or variable amounts of data that are exchanged between one or more server nodes in communication with an aggregation device in a network environment such as a data center, and enforcing security-related properties related to the transfer of the data, for example, source MAC address validation, virtual local area network (VLAN) membership, and destination MAC address filtering. The aggregation device receives a request from a source device to route a data packet through the aggregation device to a destination device. The aggregation device generates a flowtag that includes a port identifier or the like that is mapped to a MAC address of the destination device. The aggregation device can also generate a credential which can be used to seal the flowtag. The flowtag is received by the source device and stored in a flowtag cache. In addition to a credential, the flowtag can include switch port numbers or other routing information that is used by the aggregation device in lieu of a MAC address for routing the data to the destination device. During a subsequent data exchange, the aggregation device directs a packet received from the source device to a port corresponding to the port number or related identifier in the flowtag. The aggregation device uses the port number or the like from the received flowtag to route the data instead of a MAC address. Accordingly, MAC address lookups are not necessary. This permits decode functions or the like to be performed in software at the aggregation device instead of a hardware-intensive CAM table, thereby reducing hardware efforts generally required when processing MAC addresses.

Related, additional or alternative features of the present inventive concepts can also reduce the risk of exposure of MAC addresses to spoofing and the like, especially in virtualization applications. This can be achieved by the aggregation device validating the credential received with the flowtag, which seals the flowtag contents, prior to routing the packet to the destination device. The credential can be validated by recalculating the credential at the aggregation device and comparing it to the received credential.

FIG. 1 is a block diagram of a computing environment 10, in which embodiments of the present inventive concepts can be practiced. The computing environment 10 can include a data network, where data is exchanged between elements of the network. The computing environment 10 includes a plurality of server nodes 112-1 through 112-N (generally, 112), where N is an integer greater than 0. The server nodes 112 are each coupled to an aggregation device 200 by a Peripheral Component Interconnect Express (PCIe) connector or the like for establishing a communication path 116 with an aggregation device 200. The server nodes 112 can comprise single socket servers or related microprocessor devices attached to the aggregation device 200 by PCIe interfaces and the like. Other low-power host devices can be constructed and arranged to communicate with the aggregation device 200. The server nodes 112 can be constructed and arranged as a processor cluster or other well-known arrangement. One or more server nodes 112 can be virtualized or non-virtualized.

A server node 112 includes one or more network interfaces, for example, NICs. A virtualized server node and/or the aggregation device 200 can include multiple virtual network interface cards (vNICs).

A server node 112 includes a processor 102, which can include one or more microprocessors, central processing units (CPUs), graphics processing units (GPUs), digital signal processors (DSPs), application-specific integrated circuits (ASICs), memory controllers, multi-core processors, or other types of data processing devices, or portions and combinations of these and other devices.

A server node 112 also includes a memory (not shown). The memory can be a non-volatile or volatile memory, for example, DRAM or static RAM (SRAM). Stored at the memory 104 includes program code of an operating system, one or more applications, or other software programs executed by a processor 102. Also stored at the memory 104 can include some or all of a node interface 122, a device driver 124, a flowtag cache 126, and a network stack 128.

The node interface 122 can include a PCIe port or related network connector, and communicate with the device driver 124 for establishing the communication path 116 with the aggregation device 200.

The flowtag cache 126 stores MAC address-to-routing information map data. The routing information can include the egress port or other identifiers corresponding to the destination device. In an embodiment, the flowtag cache 126 maps a tuple, for example, {destination MAC address, VLAN tag (if present)}, to a variable length flowtag. For example, the flowtag cache 126 can map the MAC address of server node 112-2 with Port 2 at the aggregation device 200. The flowtag can be inserted into a header that is transmitted with an Ethernet frame or other unit of data, e.g., a cell, packet, or the like, to the aggregation device 200.

The driver 124, also referred to as a host driver, can manage the flowtag cache 126. In an embodiment, the driver 124 includes a virtual queue interface 132 that communicates with a virtual queue, or virtual queue 218, supported by a vNIC at the aggregation device 200.

The network stack 128 can include a multi-layer software stack for network communications. The network stack 128 can include a Transmission Control Protocol (TCP), User Datagram Protocol (UDP), or related protocols included in an Internet Protocol (IP) suite. The network stack 128 can include other network, transport, and/or link layers, or other abstraction layers, for example, which comply with the Open Systems Interconnection (OSI) model. For example, a link layer of the network stack 128 can attach a source and destination MAC address, allowing data packets to be directed to a specific network interface on the server node 112-1, for example, interface 122.

As described above, the server node 112-1 can be virtualized. A virtualized server node 112-1 can include one or more virtual machines (not shown) or guests, a hypervisor, and/or other virtualization elements, permitting the server node 112-1 to share hardware, such as a physical NIC 242, and/or a BIOS, HBA, or other hardware device in communication with the aggregation device 200.

The aggregation device 200 can be coupled between the server nodes 112 and one or more network interface cards (NICs) 242 or related network adaptors, so that the server nodes 112 can communicate with one or more remote electronic devices 152. The aggregation device 200 can be used as a connection fabric for the server nodes 112, which can be organized into a cluster, replacing some or all of the traditional Ethernet switching requirements used in conventional server racks.

The aggregation device 200 can include a switch fabric 202, an input/output (I/O) processor 204, a packet management device 210, a plurality of ports 1-N, and a corresponding plurality of port processors 216-1 through 216-N, where N is an integer greater than 1.

The ports 1-N can be input ports and/or output ports. The port processors 216 can provide PCIe links or the like that form communication paths 116 with a server node 112. The port processors 216 can include transmit and/or receive control logic and decode logic for processing incoming packets from the server nodes 112.

The switch fabric 202 provides a data plane interconnection between the server nodes 112, exchanging data between the server nodes 112 and/or one or more remote electronic devices 152 in communication with the aggregation system 200 via one or more NICs 242.

The I/O processor 204 processes data transferred between the aggregation system 200 and the server nodes 112 and/or remote computing devices 252. The I/O processor 204 can oversee the transfer of data packets between the server nodes 112 and/or one or more remote computing devices 152. In an embodiment, the I/O processor 204 includes a network processor for exchanging data between server nodes 112 and/or the remote electronic device 152. In another embodiment, the I/O processor 204 includes a multiplexer and other logic for performing data transfers to and from the switch fabric 202 in accordance with a control plane processor (not shown), for example, at which a plurality of vNICs can be provided. Here, the I/O processor 204 can serve as a staging area for transmitting data into and out of the aggregation device 200, for example, between two or more server nodes 112, or between a server node 112 and the remote computing device 152.

Figure 2:
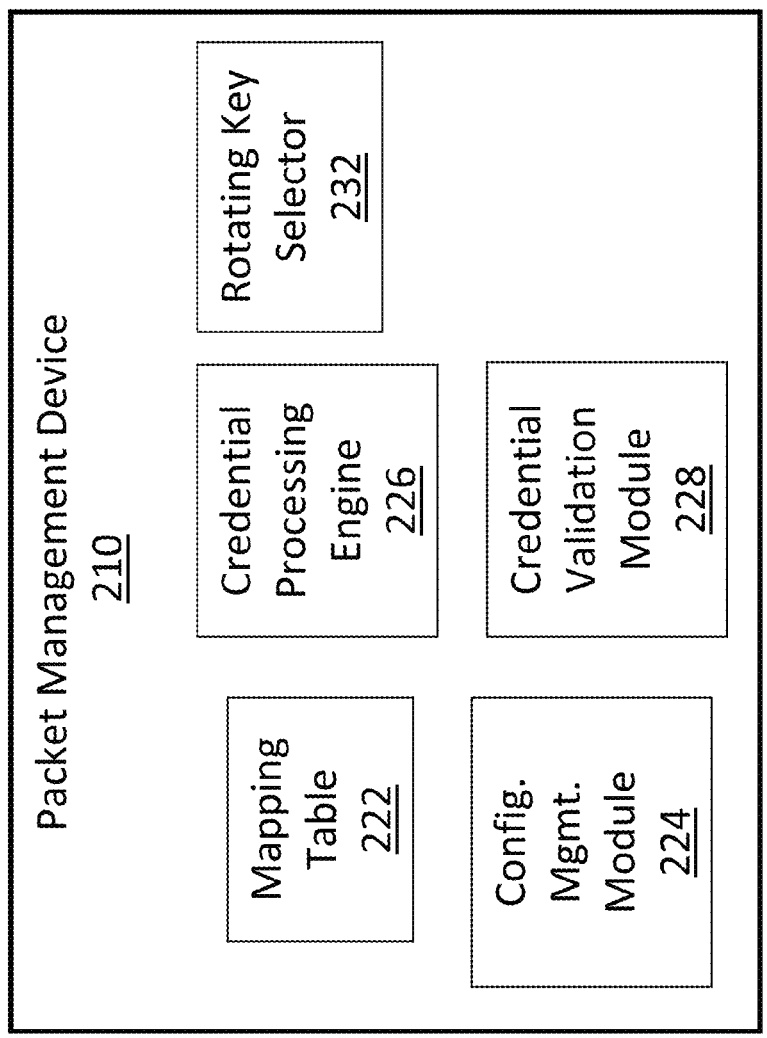
FIG. 2 is a block diagram of the packet management device of the aggregation system of FIG. 1, in accordance with an embodiment.

FIG. 2 is a block diagram of the packet management device 210 of the aggregation system of FIG. 1, in accordance with an embodiment. The packet management device 210 includes a mapping table 222, a configuration management module 224, a credential processing engine 226, a credential validation module 228, and a rotating key selector 232.

The mapping table 222 includes a set of mappings between MAC addresses of source server nodes in communication with the aggregation device 200 and aggregation system ports 1-N. The mapping table 222 can be part of a software application that tracks and manages MAC addresses of the server nodes 112 and/or other devices in communication with the aggregation device 200 and the ports that the server nodes 112 and/or other devices are on. For example, referring to FIG. 2, MAC addresses assigned to server nodes 212A and 212B, respectively, can each be associated with a switch port of the switch ports 1-N, requiring less processing than a hardware-intensive CAM table.

The configuration management module 224 can detect configuration changes related to MAC addresses. For example, the configuration management module 224 can detect when a device has changed to a different port at the aggregation device 200. Here, a management device such as an external controller can update the mapping table 222 with a mapping between a MAC address of the device and the new port.

The credential processing engine 226 generates credentials that can be used to protect routing information such as port numbers or the like in an exchange between the aggregation device 200 and the server node 112. This can be achieved, for example, by a credential sealing elements of a data packet such as a flowtag and header information such as MAC addresses. The credential processing engine 226 can generate a credential on a per-virtual machine or per-port basis. A cache of credentials can be maintained by a host driver 124. A credential can be constructed by the credential processing engine 226 by computing a one-way hash of a flowtag and related header information, for example: {per port seed, port number, link number, virtual queue tag}. The credential processing engine 226 can assign one or more credentials based on a virtual queue (VQ) tag, VLAN membership, and/or a currently active key, or a port seed or rotating value of a credential, used for rotating credentials, so that a credential can be used more than once.

The credential validation module 228 authenticates flowtag data can validate a credential received with a flowtag against a copy generated, or recalculated, at an ingress port at the aggregation device 200. Once the credential is validated, the flowtag contents can be used to route the packet to the appropriate destination virtqueue 218.

As described herein, a credential can be recycled at the aggregation device 200. The rotating key selector 232 can recycle credentials on a predetermined basis, and can maintain a status of the credentials. This can be achieved by a key, for example, a per-VQ key, that is periodically rotated by the rotating key selector 232 to prevent or otherwise reduce the risk of an unauthorized host or other snooping device from subverting the credential.

Figure 3:
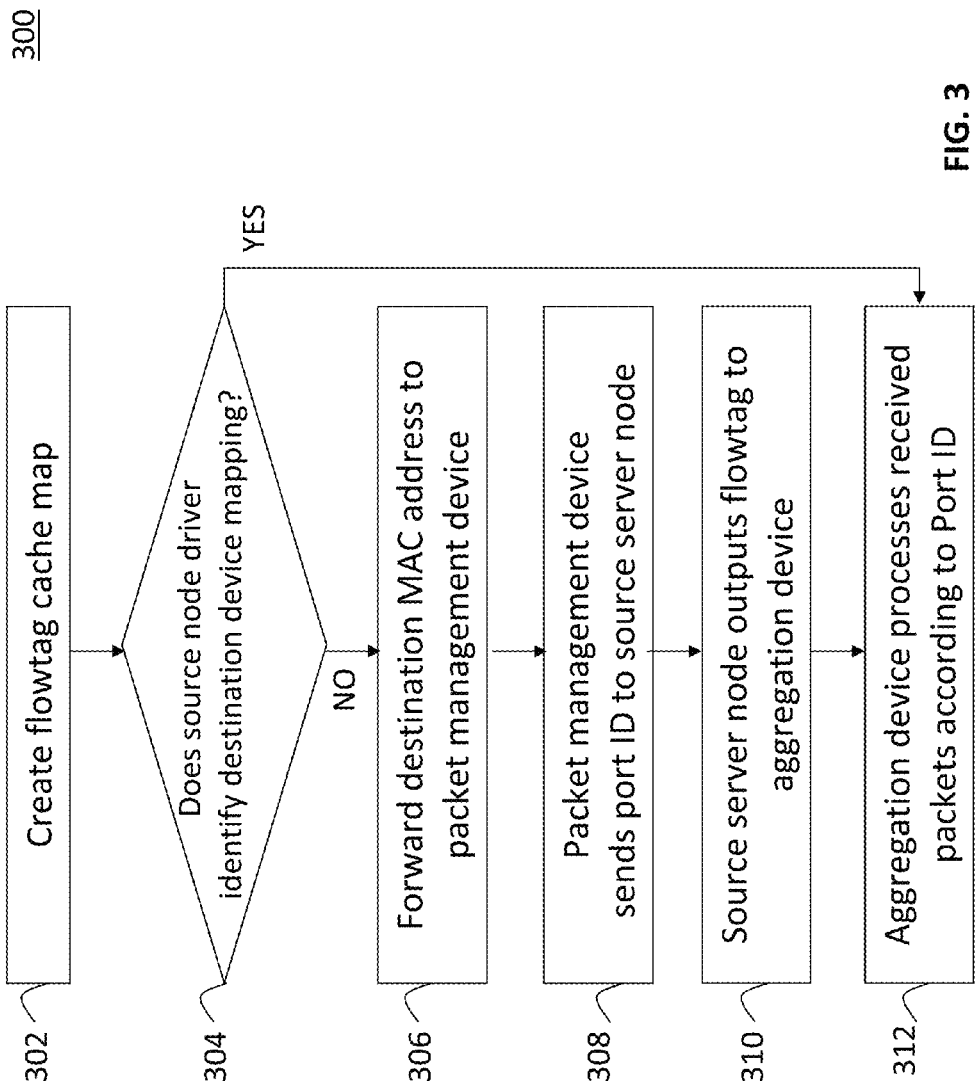
FIG. 3 is a flow diagram of a method for managing a data exchange in a network environment, in accordance with an embodiment.

FIG. 3 is a flow diagram of a method 300 for managing a data exchange in a network environment, in accordance with an embodiment. In describing the method 300, reference is made to elements of FIGS. 1 and 2.

At block 302, a flowtag cache map is created. The flowtag cache map can include a mapping between server node MAC addresses and device ports at the aggregation device 200. For example, referring to FIG. 1, a flowtag cache map at the cache 126 can include a first mapping between a MAC address of the server node 112-1 and Port 1 of the aggregation device 200 and a second mapping between a MAC address of the server node 112-2 and Port 2 of the aggregation device. The flowtag cache map can be populated by data collected at the aggregation device 200 related to MAC address-to-port mappings, for example, a new device coupled to the aggregation device 200.

At decision diamond 304, a determination is made whether a source node driver, for example, a driver 124 of the server node 112-1, can identify a mapping between a destination MAC address, for example, a MAC address of the destination server node 112-2, and an egress port identification (ID), e.g., Port 2, of which the destination server 112-2 is in communication. If the source driver 124 determines the mapping between the MAC address of the destination server node 112-2 and the port at the aggregation device 200 communicating with the destination server node 112-2, i.e., Port 2, then the method 300 proceeds to block 312, where the aggregation device 200 processes packets sent from the source server node 112-1 to the destination server node 112-2 according to the port ID of the destination server node 112-2, i.e., Port 2, instead of the destination MAC address.

If the source driver 124 does not identify a mapping between the MAC address of the destination server node 112-2 and the destination port, i.e., Port 2, then the method 300 proceeds to block 306, where the destination MAC address is forwarded to the packet management device 210.

At block 308, the packet management device 210 can send a port number or related identifier to the source server node 112-1 that corresponds to the received destination MAC address. The port number preferably relates to an egress port at which the destination server node 112-2 having the destination MAC address is in communication. The port number or related identifier can be part of a flowtag generated at the packet management device, which is sent to the source server node 112-1 in response to a request. The flowtag can be stored at the flowtag cache 126.

At block 310, the source server node 112-1 outputs a data packet including a flowtag to the aggregation device 200 for routing to its destination. The data packet can be an Ethernet packet or the like.

At block 312, the aggregation device 200 processes the data packet sent from the source server node 112-1 to the destination server node 112-2 according to the port number or related identifier of the destination server node 112-2, i.e., Port 2. Since routing occurs according to the port number, less processing is required than configurations where routing occurs according to a MAC address.

Figure 4:
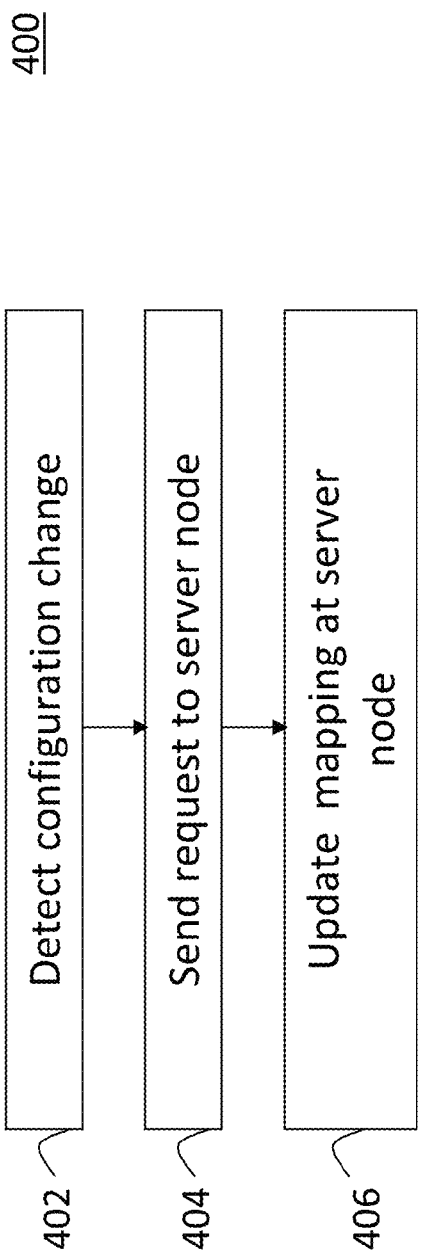
FIG. 4 is a flow diagram of a method for managing a data exchange in a network environment, in accordance with another embodiment.

FIG. 4 is a flow diagram of a method 400 for managing a data exchange in an electronic communications environment, in accordance with another embodiment. In describing the method 400, reference is made to elements of FIGS. 1-3.

At block 402, a configuration change is detected. A configuration change can include a change to a different port by a server node 112. A server node 112 or external device 152 can be reconfigured with a different MAC address, or a MAC address can be relocated to a different server node 112 or external device 152. Here, the cache 126 at the source server node 112-1 may have an entry that refers to a MAC address mapped to Port 2 of the aggregation device 200. However, the aggregation device 200, more specifically, the configuration manager 228 of the packet management device 210, can detect that a different MAC address is in communication with Port 2, or that the MAC address stored at the cache 126 has been changed to a different MAC address. In another example, the aggregation device 200 detects that a virtual machine at a server node 112 is assigned a different MAC address.

At block 404, the packet management device 210 sends a request to the source server node 112-1. The request can include an invalidation request, indicating to the source server node 112-1 that the previous mapping of the destination MAC address and Port 2 is no longer valid. In another embodiment, the request includes an update request for the source server node 112-1. The source server node 112-1 erases the previous mapping information in the flowtag cache 126 and processes new mapping information. Accordingly, a request can be sent by the packet management device 210 to invalidate the previous mapping at the flowtag cache 126, or, alternatively, an indicator can be sent to the source server node 112-1 to perform the invalidation and subsequent updating of the mapping.

At block 406, the flowtag cache 126 is updated to include MAC address-to-port mapping information that reflects the configuration change detected at block 402. The MAC address-to-port mapping information is provided from the mapping table 222 of the packet management device 210.

Figure 5:
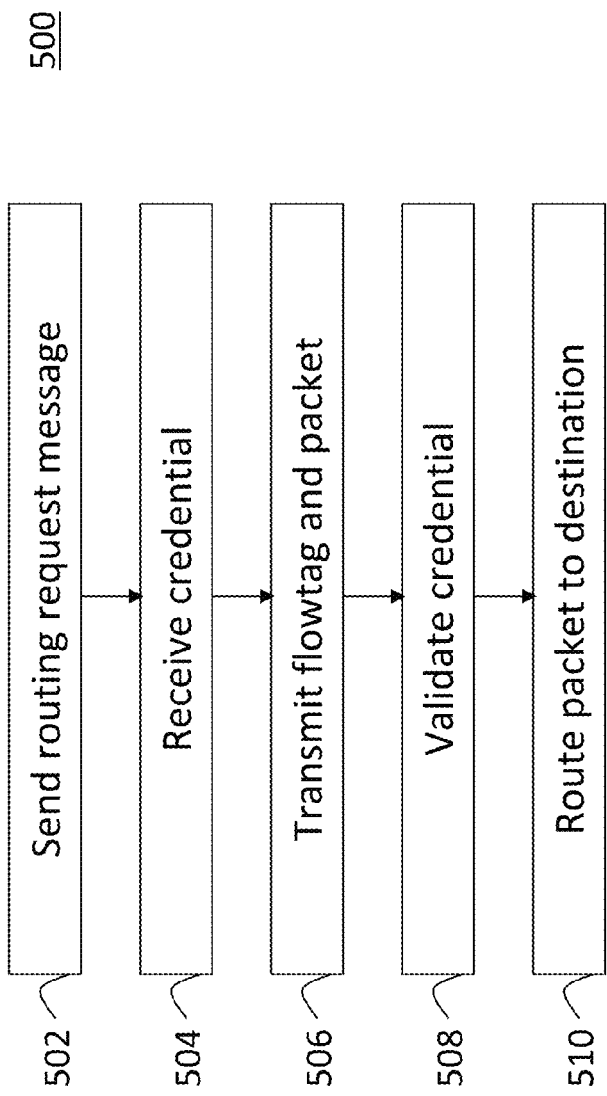
FIG. 5 is a flow diagram of a method for authenticating a packet, in accordance with an embodiment.

FIG. 5 is a flow diagram of a method 500 for validating packet data, in accordance with an embodiment. In describing the method 500, reference is made to elements of FIGS. 1-4. The method 500 can be applied to address security-related problems, for example, where routing information such as a MAC address in a guest driver of a virtualized server node may be acquired for spoofing or prone to other unauthorized or illicit uses, for example, to prevent others from circumventing access to the server nodes to acquire data.

At block 502, the source server node 112-1 can send a routing request message to the aggregation device 200. The routing request message can include a request for a destination MAC address or other routing data.

At block 504, the packet management device 210 of the aggregation device 200 can send routing data in response to the request made at block 502. In an embodiment, the aggregation device 200 sends a credential with a flowtag instead of a requested destination MAC address according to mapping information at the mapping table 222.

The aggregation device 200 can also send a credential and/or other information such as VLAN membership data with the routing data to the requesting source server node 112-1. A credential can be created by the credential processing engine 226. The credential can be constructed by computing a one-way hash of flowtag data and/or packet header information, such as a per-port seed, port numbers, link numbers, virtual queue identifiers or tags, and/or a generation identification, which can be used for recycling credentials as described below. In an embodiment, a credential is created for each virtual machine of a server node 112. In another embodiment, a credential is created for each port 1-N to which a server node 112 or other electronic device is coupled. The credential processing engine 226 can assign a credential based on the virtual queue tags, VLAN membership for the source, and/or a currently active key, described below with respect to FIG. 7.

At block 506, the server node 112 transmits a packet or related unit of data that includes a flowtag. The flowtag can include data related to the destination port, VLAN data, and/or other routing data, for example, described herein. The flowtag can include a credential and/or the generation identification, or phase identification provided by the aggregation device 200 described at block 504. The packet provided with the flowtag can be an Ethernet packet or the like.

At block 508, the packet management device 210 validates the credential received with the flowtag. The credential validation module 228 can validate the received credential against a copy generated at the ingress port, for example, by recalculating the credential, for example, performing a one-way hash. In an embodiment, the credential validation module 228 communicates with one or more virtual queues at the aggregation device 200 that allow a guest to post descriptors pointing to data buffers to the server nodes 112, and the server nodes 112 to release descriptors back to the guest for re-use. Here, a flow path can be established with a requesting server node virtual machine's NIC for moving the flowtag and packet through the aggregation device 200.

At block 510, once validation is completed, flowtag contents such as an aggregation device egress port number can be used for routing the packet to its destination. The packet can be routed to a destination virtual queue 218 at the aggregation device 200, for example, for data buffering. In other embodiments, the packet is routed directly to an egress port 1-N for output to a destination server node 112 or remote device.

Figure 6:
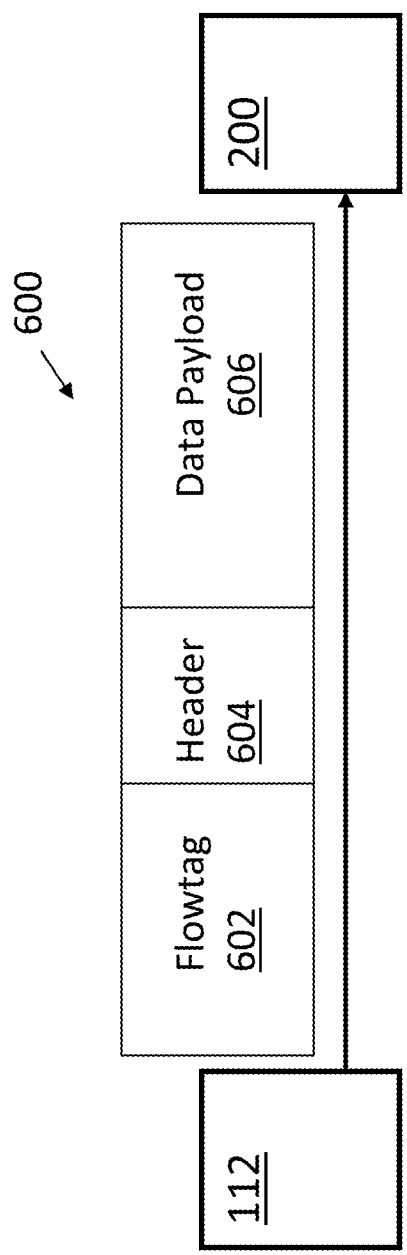
FIG. 6 is a diagram illustrating contents of a packet output from a server node to an aggregation device, in accordance with an embodiment.

FIG. 6 is a diagram illustrating contents of a packet 600 output from a server node 112 to an aggregation device 200, in accordance with an embodiment;

The unit of data 600 can be a packet, frame, cell, or the like. The unit of data 600 includes a flowtag 602, a header 604, and a data payload 606. The flowtag 602 can be the same as or similar to those described in accordance with embodiments herein. The header 604 can be an Ethernet header or the like, and can include a preamble, source MAC address, destination MAC address, VLAN ID, and/or Ethernet type fields.

The flowtag 602 can include a port ID field, a credential field, and/or a generation ID field. The port ID field can include a destination port number. The port number in the port ID field can be used for routing the network packet 604 to a destination device. The credential field can include a credential generated by the aggregation device 200 and provided to the server node 112-1 during a data exchange, for example, in accordance with a method described herein.

The generation ID field can include a generation identification, or port seed, which can be used to prevent a snooper from gathering information over time which would otherwise weaken a hash. The generation ID permits the aggregation device 200 maintains a status of generated credentials, and permits the credentials to be periodically recycled, for example, by tracking the credential.

Figure 7:
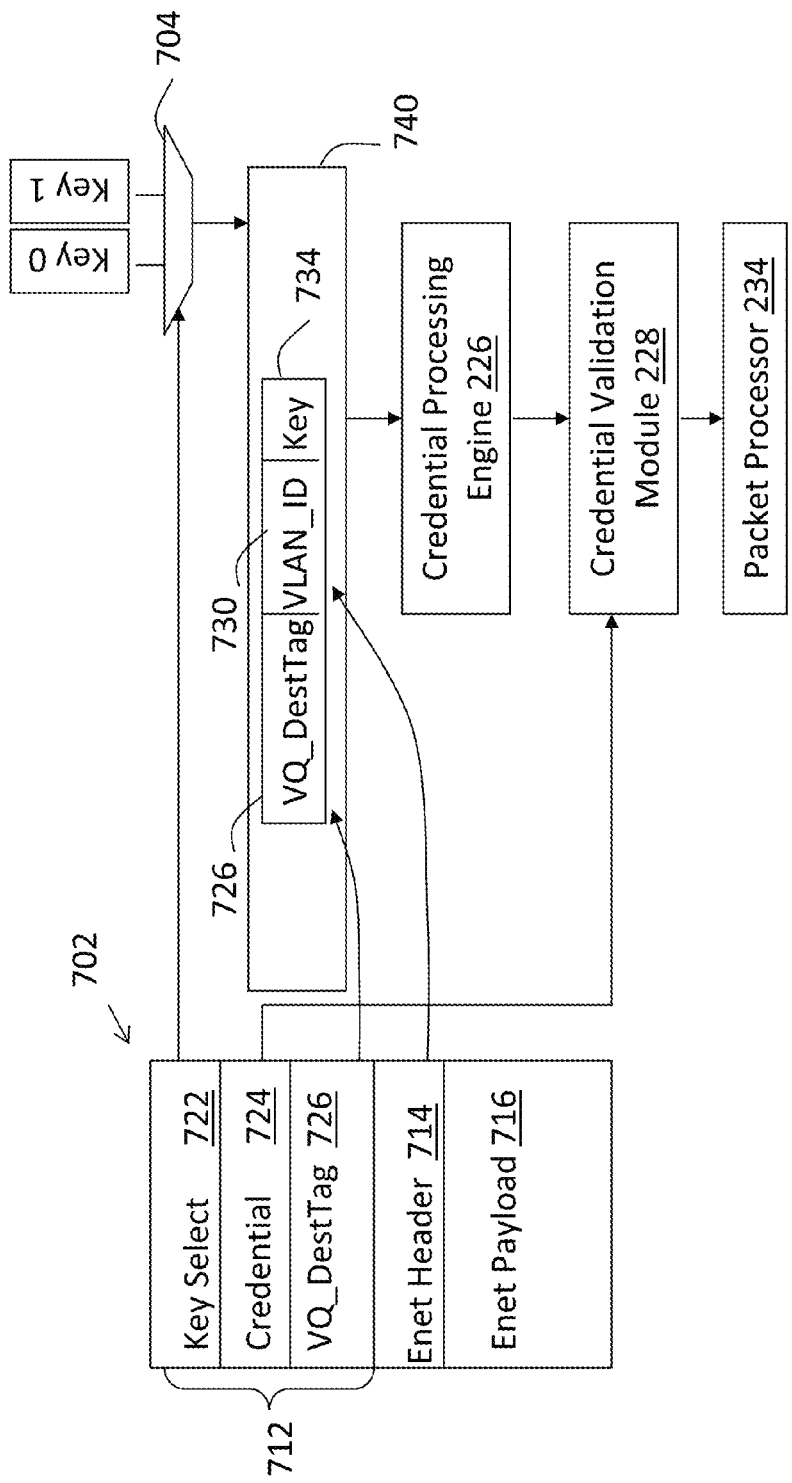
FIG. 7 is a detailed block diagram illustrating a validation process, in accordance with an embodiment.

FIG. 7 is a detailed block diagram illustrating a packet validation flow, in accordance with an embodiment. In describing the packet validation flow, reference is made to elements of FIGS. 1-6, in particular, to the credential validation step described at block 508 of FIG. 5.

A server node 112 transmits a packet 702 or the like to the aggregation device 200. The packet 702 includes a flowtag 712, an Ethernet header 714, and a payload 716. The flowtag 712 can be similar to the flowtag 602 described at FIG. 6. In other embodiments, as shown in FIG. 7, the flowtag 712 includes a key select field 722, a credential field 724, and a VQ_DestTag field 726.

The key select field 722 includes a key select value that is used by the rotating key selector 704, also referred to as a generation identification (ID), to select a valid encryption key (Key 0, Key 1). The selected encryption key 734 can be used when a credential is generated that is compared to the credential 724 in the flowtag 712 during the validation process. The keys (Key 0, Key 1) can be stored at the aggregation device 200 and can be rotated by the credential processing engine 226 on a predetermined basis, for example, every 4 seconds, in order to reduce the risk of an unauthorized party such as a snooper from subverting the mechanism for generating and validating credentials.

The credential 724 can be generated and inserted in the flowtag 712 according to embodiments described herein, for example, generated by the credential processing engine 226. The credential 724 is validated by the credential validation module 228 in part by the credential processing engine 226 recalculating the credential using data 740 received from the incoming packet 702, such as the VLAN membership identification (VLAN_ID) 730 of the Ethernet header 714.

The VQ_DestTag 726 relates to a virtual queue that identifies the destination device for receiving the packet data. The VQ_DestTag 726 can be created by decoding a MMIO mailbox write address and data related to the storing of the packet data in a buffer or the like at the aggregation device 200 for receipt by the destination device.

The Ethernet header 714 can include one or more fields that are well-known to those of ordinary skill in the art, such as a preamble, source MAC address, destination MAC address, VLAN ID, and Ethernet type fields.

During a packet validation operation, the credential validation module 228 generates a credential that is compared to the credential 724 of the packet 702. The VQ_DestTag 726 and the VLAN ID of the Ethernet header 714 can be combined with the VQ_SrcTag and a key (Key 0, Key 1) output from the rotating key selector 232 to generate the credential, which can be compared to the credential 724 in the received flowtag 702 to produce a validation result. If the validation fails, then the packet can be dropped, and a log can be created of the result. If the validation passes, the packet processor can process the received data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method for managing a data exchange in a network environment, comprising:
transmitting a flowtag from an aggregation device to a source device, the flowtag including a port identification corresponding to an egress port at the aggregation device that corresponds to a destination MAC address of a destination device;
storing the flowtag at a flowtag cache at the source device;
receiving a data packet from the source device including the flowtag retrieved from the flowtag cache;
authenticating the data packet at the aggregation device; and
outputting the authenticated data packet according to the port identification in the flowtag of the authenticated data packet.

2. The method of claim 1, wherein the authenticated data packet is output to the destination device in communication with the port at the aggregation device, and wherein the port identification is mapped to a MAC address of the destination device.

3. The method of claim 1, wherein the source device includes a server node.

4. The method of claim 1, further comprising:
sending a request from the source device to the aggregation device for the port identification, the request including a MAC address of a destination device;
sending, by the aggregation device, the port identification to the source device according to a mapping table entry at the aggregation device that associates the received MAC address with the port identification.

5. The method of claim 4, further comprising:
generating the flowtag at the aggregation device;
forwarding the flowtag including the port identification to the source device;
storing, at the source device, the flowtag.

6. The method of claim 1, further comprising:
detecting a configuration change;
sending a request from the aggregation device to the source device, the request including data related to the configuration change; and
updating a flowtag cache in response to the request to include the data related to the configuration change.

7. The method of claim 1, wherein validating the flowtag comprises:
sending a routing request message from the source device to the aggregation device;
receiving from the aggregation device a credential that seals the flowtag;
transmitting the flowtag and the data packet from the source device to the aggregation device, the flowtag including the routing data and the credential; and
validating the credential at the aggregation device.

8. The method of claim 7, wherein the flowtag comprises a generation ID that corresponds to the credential among a plurality of credentials generated at the aggregation device.

9. The method of claim 7, wherein validating the credential comprises:
generating the credential at the aggregation device;
comparing the credential sent from the source device with a recalculated credential at the aggregation device; and
processing the data packet in response to a comparison result.

10. The method of claim 9, further comprising:
discarding the data packet and creating a log of the validation result in response to a determination that the credential sent from the source device is invalid.

11. The method of claim 9, further comprising:
providing a key from a rotating key selector at the aggregation device;
and
using the key to select the credential from a plurality of generated credentials at the aggregation device.

12. The method of claim 1, further comprising:
maintaining a flowtag cache at the source device, the flowtag cache including flowtags including information related to a mappings between device MAC addresses and port identifications.

13. A method for processing a data packet, comprising:
receiving, at a source device, a flowtag and a credential generated at an aggregation device, the flowtag including routing data comprising a port identification corresponding to an egress port at the aggregation device that corresponds to a destination MAC address of a destination device;
storing the flowtag at a flowtag cache at the source device; and
outputting a data packet including the flowtag and a corresponding unit of data from the source device to a aggregation device.

14. The method of claim 13, wherein the routing data in the flowtag includes an aggregation device port identification corresponding to a MAC address of a destination device.

15. The method of claim 13, wherein the flowtag comprises a generation ID that corresponds to the credential among a plurality of credentials generated at the aggregation device.

16. The method of claim 13, further comprising:
creating a log of a validation result in response to a determination of invalidity of the credential sent from the source device.

17. The method of claim 13, further comprising:
providing a key from a rotating key selector at the aggregation device;
and
using the key to select the credential from a plurality of generated credentials at the aggregation device.

18. The method of claim 13, further comprising:
authenticating the data packet by validating the credential at the
aggregation device;
processing the unit of data is according to the routing data in the flowtag in response to validating the credential.

19. A data network, comprising:
a source device that assigns a flowtag to a data packet in a data transfer operation, the flowtag including a port identification corresponding to an egress port at an aggregation device that corresponds to a destination MAC address of a destination device;
a destination device that receives the data packet in the data transfer operation; and
the aggregation device having a first port to which the source device is in communication and a second port to which the destination device is in communication, wherein the aggregation device includes a packet management device that processes routing data in the flowtag and validates a credential that seals the flowtag, the routing data in the flowtag including a port identification corresponding to the second port, and wherein the aggregation device transfers the data packet according to the port identification in the flowtag from the source device to the destination device.

20. The data network of claim 19, wherein the source device comprises a flowtag cache that includes a plurality of entries, a first entry including a mapping between a MAC address of the source device and a port identification corresponding to the first port and a second entry including a mapping between a MAC address of the destination device and the port identification corresponding to the second port.

21. The data network of claim 19, wherein the packet management device comprises a mapping table that provides the mapping between the MAC address of the destination device and the port identification corresponding to the second port in response to a request sent from the source device.

22. The data network of claim 21, wherein the packet management device comprises a configuration management module that detects a port configuration change, and wherein the mapping table is updated in response to the port configuration change.

23. The data network of claim 19, wherein the packet management device comprises a credential processing engine that generates the credential.

24. The data network of claim 23, wherein the packet management device comprises a credential validation module that validates the credential received from the source device.

25. The data network of claim 24, wherein the packet management device comprises a rotating key selector that provides a key for selecting the credential from a plurality of credentials.

26. An aggregation device, comprising:
a first port in communication with a source device;
a second port in communication with a destination device; and
a packet management device comprising a mapping table, the mapping table including a first mapping between the first port and the source device and a second mapping between the second port and the destination device, wherein the packet management device receives a unit of data from the source device and routes the data to the destination device according to information related to the second port provided with the unit of data, the unit of data including a port identification corresponding to an egress port at the aggregation device that corresponds to a destination MAC address of a destination device.

27. The aggregation device of claim 26, wherein the packet management device comprises a configuration management module that detects a port configuration change, and wherein the mapping table is updated in response to the port configuration change.

28. The aggregation device of claim 27, wherein the packet management device comprises a credential processing engine that generates a credential for authenticating the unit.

29. The aggregation device of claim 28, wherein the packet management device comprises a credential validation module that uses the generated credential to validate a credential received with the flowtag from the source device.

30. The aggregation device of claim 28, wherein the packet management device comprises a rotating key selector that provides a key for generating the credential.

31. A computer program product, comprising:
a non-transitory computer readable storage medium having computer readable program code embodied therewith, the computer readable program code comprising:
computer readable program code configured to assign a flowtag to a data packet at a source device, the flowtag including a port identification corresponding to an egress port at the aggregation device that corresponds to a destination MAC address of a destination device, wherein the destination device is in communication with the port at the aggregation device;
computer readable program code configured to store the flowtag at a flowtag cache at the source device;
computer readable program code configured to authenticate the data packet at the aggregation device; and
computer readable program code configured to output the data packet from the source device to the destination device via the aggregation device according to the port identification in the flowtag of the authenticated data packet.

* * * * *